US012585627B1

(12) United States Patent　　　　(10) Patent No.:　US 12,585,627 B1

Macnaughton　　　　　　　　　　　(45) Date of Patent:　Mar. 24, 2026

(54) EFFICIENT DATABASE READS BASED ON CHECKPOINT AVOIDANCE

(71) Applicant: Oracle International Corporation, Redwood Shores, CA (US)

(72) Inventor: Neil James Scott Macnaughton, Lakeside, MT (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/936,031

(22) Filed: Nov. 4, 2024

(51) Int. Cl.
| | |
|---|---|
| *G06F 16/00* | (2019.01) |
| *G06F 16/215* | (2019.01) |
| *G06F 16/22* | (2019.01) |
| *G06F 16/23* | (2019.01) |

(52) U.S. Cl.
CPC ........ *G06F 16/215* (2019.01); *G06F 16/2255* (2019.01); *G06F 16/2343* (2019.01)

(58) Field of Classification Search
CPC ............. G06F 11/1438; G06F 11/1474; G06F 11/1482; G06F 16/22; G06F 16/2228; G06F 16/2282; G06F 16/2358; G06F 16/24554; G06F 16/2462; G06F 16/273; G06F 16/285; G06F 16/951; G06F 2201/80; G06F 16/27; G06F 2201/84; G06F 16/219; G06F 16/275; G06F 15/00; G06F 17/40; G06F 7/00; G06F 3/065; G06F 16/214
See application file for complete search history.

(56) References Cited

U.S. PATENT DOCUMENTS

| | | | | |
|---|---|---|---|---|
| 10,877,950 | B2 * | 12/2020 | Lindahl | ................. G06F 16/285 |
| 2010/0050176 | A1 * | 2/2010 | Vanderpool | ......... G06F 11/1482 |
| | | | | 718/100 |
| 2012/0136901 | A1 * | 5/2012 | Raatikka | ............. G06F 16/2358 |
| | | | | 707/E17.05 |
| 2012/0150844 | A1 * | 6/2012 | Lindahl | ................. G06F 16/273 |
| | | | | 707/769 |

* cited by examiner

*Primary Examiner* — Shyue Jiunn Hwa
(74) *Attorney, Agent, or Firm* — Hickman Becker Bingham Ledesma LLP

(57) ABSTRACT

Disclosed herein are techniques related to efficient database reads based on checkpoint avoidance. The techniques may include determining, by a database server instance in a multi-node database system, whether a database object is dirty. The multi-node database system may include a plurality of database server instances that share access to a database that stores the database object. The techniques may also include sending a request to one or more database server instances of the plurality of database server instances to perform a global checkpoint on the database object if the database object is dirty. The techniques may further include commencing an operation that requires reading the database object if the database object is not dirty.

18 Claims, 6 Drawing Sheets

Object Hash Table 109--1a "Hash key is Object ID"

Value 204

| | |
|---|---|
| Bucket 202--1 | 0 |
| Bucket 202--2 | 1 |
| Bucket 202--3 | 1 |
| | ... |
| Bucket 202--N | 0 |

Figure 4:
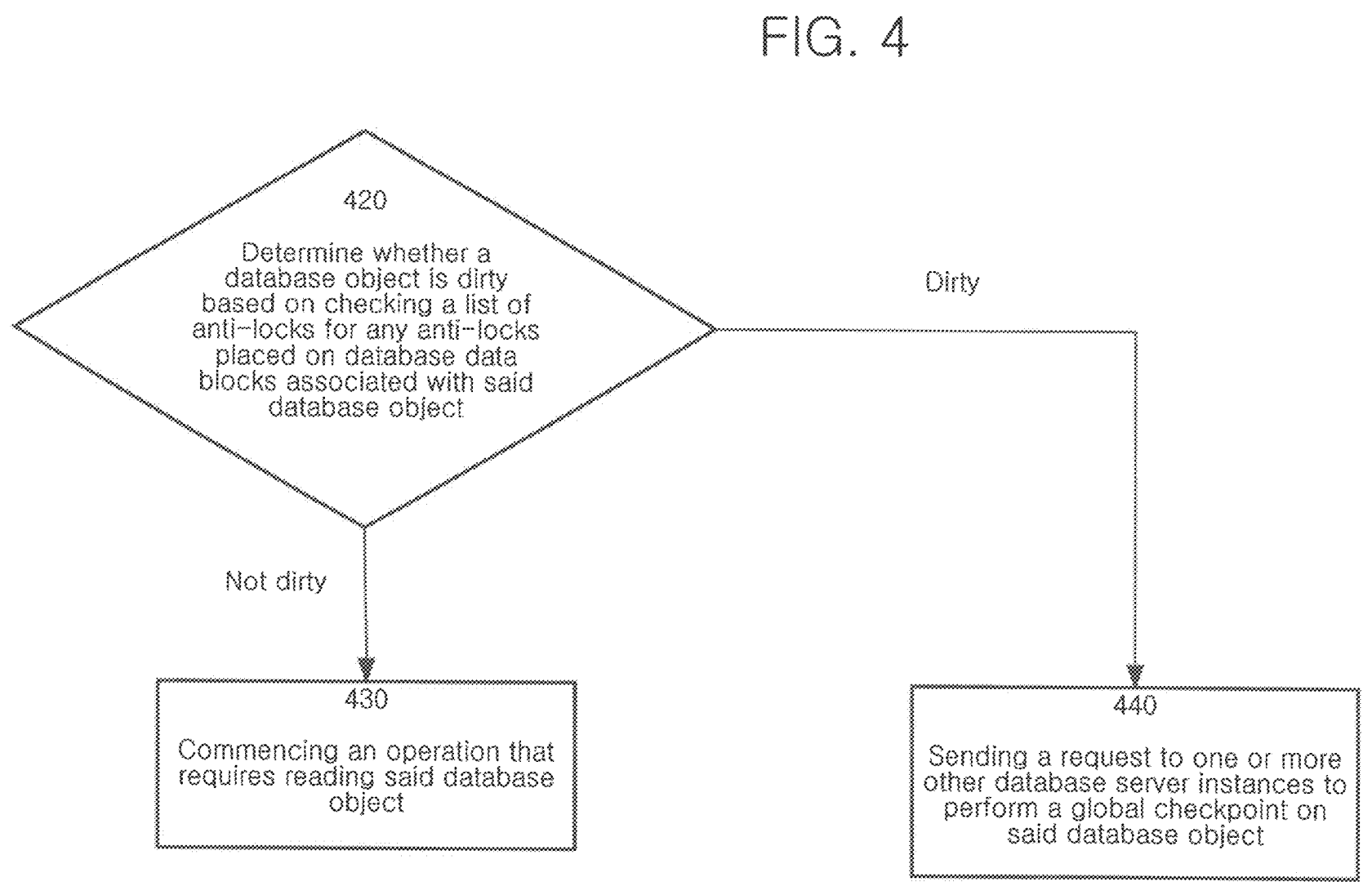

Determine whether a database object is dirty based on checking a list of anti-locks for any anti-locks placed on database data blocks associated with said database object

Dirty →

440

Sending a request to one or more other database server instances to perform a global checkpoint on said database object

Not dirty →

430

Commencing an operation that requires reading said database object

EFFICIENT DATABASE READS BASED ON CHECKPOINT AVOIDANCE

TECHNICAL FIELD

The present disclosure relates to the field of database systems, and in particular retrieving data more efficiently in database systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Executing a database query in a database system requires reading the database data from storage. In a multi-node database system that manages a database, multiple nodes each host a database server instance that accesses a database that is stored separately on one or more storage servers. To process particular database data, a database server instance may send a read request to a storage server to read the requested data. Once received, the database server instance stores the database data in a database buffer and then processes the database data.

A powerful feature for accelerating reading and processing of database data is a "smart scan". In a smart scan, processing to be performed on a particular database object for a query by a database server instance is offloaded to a storage server.

For example, a database server instance executes a query against a table. The query filters rows in the table by a column of the table according to filter criteria. The table is a partitioned table that is divided into table partitions. Database data for a table partition is stored in one or more sets of database blocks. A table and a table partition are referred to herein as database objects. A partitioned table is a database object that comprises multiple database objects in the form of table partitions.

To execute the query more efficiently, the database server instance sends a smart scan request to a storage server for each table partition to filter data blocks according to the filter criteria. In response, the storage server scans the data blocks in the table partition for rows that satisfy the criteria and returns the rows that satisfy criteria. The smart scan saves the cost of shipping all the data blocks in the sets to database server instances.

To perform the smart scan on a database object such as a table partition, the storage server must ensure there are no "dirty data blocks" of the database object that are stored in the database buffer. A dirty data block is a changed version of a data block that has not been stored in a storage server that stores the data block. To ensure there are no such data blocks, a global checkpoint operation is performed on the database object. In a global checkpoint operation, database server instances in a multi-node database system write any dirty blocks belonging to the database object to the storage server. By writing these dirty data blocks, each data block in a database object to be processed by the requested smart scan contains the changes and transactional metadata needed to perform the requested smart scan in a transactionally consistent manner. Performing a global checkpoint operation on each database object accessed subject to a smart scan for a query uses a significant amount of computing resources and can significantly delay execution of the query.

There are often-occurring scenarios in which there may be no dirty data blocks among the sets of data blocks that are subject to a smart scan. Even in these scenarios, a global check point operation unnecessarily delays execution of a query.

For example, a query may be executed against a set of database objects (e.g. table partitions of a table) that have incurred very little if any recent write activity. A global check point operation is performed on each database object. However, only a few of the database objects have dirty data blocks for which a global check point operation wrote to the storage servers. However, for most other database objects, the checkpoint operations merely determine that there were no dirty blocks, so the checkpoint operations do not write any dirty blocks. While these checkpoint operations did not incur the overhead of writing data blocks to a storage server, the checkpoint operations did incur the overhead of being initiated and of making a determination that there were no dirty data blocks to write. The initiation of a checkpoint operation that merely determines there are no dirty blocks of a database object nevertheless requires significant overhead that involves: broadcast messages among the database server instances, database server instances responding to those messages, and waiting for responses to messages. This is overhead that delays execution of a query.

Therefore, it would be beneficial and desirable to avoid initiation of global checkpoint operations when it is possible to do so without compromising transactional consistency.

BRIEF DESCRIPTION OF THE DRAWINGS

In the drawings:

FIG. 2 depicts an example object hash table.

FIG. 4 depicts an example process for determining whether a database object is dirty based on checking for anti-locks.

DETAILED DESCRIPTION

Figure 1:
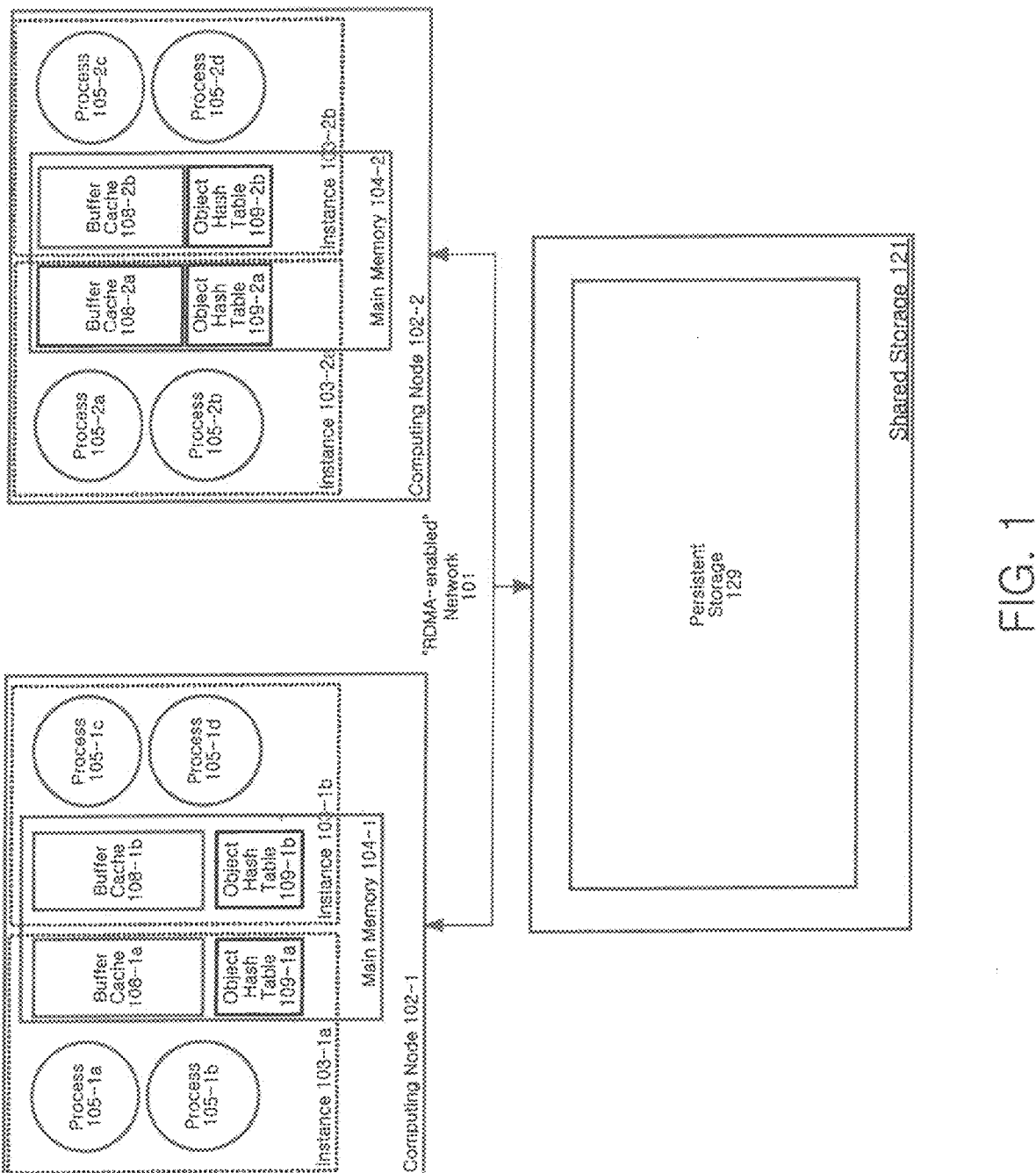
FIG. 1 depicts an example database management system upon which embodiments may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Disclosed herein are techniques to efficiently determine whether a database object is dirty in a multi-node database system. A database object is dirty when at least one of its data blocks is dirty. In brief, the disclosed techniques avoid the overhead of database server instances cooperating and messaging each other to determine whether a database object is dirty, as described above. For example, a database server instance does not need to request a global checkpoint on a database object to initiate a smart scan on the database or to otherwise commence an operation on the database object that requires reading the database object.

In some embodiments, determining whether a database object is dirty may involve checking a list of anti-locks on a data block of a database object. As discussed below, an anti-lock is generated for the data block when a resource master broadcasts an exclusive write lock for the database data. Each database instance has a copy of the list of anti-locks, so the database instance desiring to read the database data can simply check its own copy of the list without communicating with any other database instance. If there is no anti-lock for a data block in the database object, then the data block is not dirty and can be safely read. Otherwise, a set of global checkpoint operations may be performed for the database object so that it can be read.

In some embodiments, determining whether or not a database object is dirty may involve using Remote Direct Memory Access (RDMA) to check buffer cache metadata of other database instances. This can be achieved such that the other database instances are not aware that their buffer cache metadata is being accessed. The buffer cache metadata may be a hash table indicating whether or not there is a dirty database object.

Database Data Blocks

A data block is used by a database management system (DBMS) to store one or row more database rows, or portions of rows, including one or more columns of a row. When rows are read from persistent storage, a database data block containing the row is copied into a data block buffer cache in RAM and/or main memory of a database server. A data block that is used to store database data may be referred to herein as a database data block, as a database block, or simply as a data block. A database block usually contains multiple rows and database block metadata describing the contents of the database block. Metadata includes control and formatting information, such as offsets to sequences of bytes representing rows or other data structures, and a list of transactions affecting a row.

A database block is referred to as being atomic because, at least in part, a database block is the smallest unit of database data a database server may request from a persistent storage device. For example, when a database server seeks a row that is stored in a data block, the data block may only read the row from a persistent storage device by reading in the entire data block.

Database Object

As the term is used herein, a database object comprises multiple database data blocks that store database data for the database object. Often, a database object contains one or more sets of data blocks, with the data blocks in each set being stored contiguously within an address space. A database object may be a table or an index. A database object may be further divided into multiple database objects. As mentioned before, a partitioned table may be divided into multiple table partitions. Similarly, an index may be divided into multiple index partitions. A database object may be tagged or otherwise associated with an identifier (e.g., an alphanumeric identifier) for the database object.

Example Database Management System

A DBMS comprises at least one database server. The database server is hosted on at least one computing element and may store database data in block mode storage devices. The block mode storage devices may be one or more disk drives and flash drives connected via a high-speed bus of the computing element to the one or more hardware processors ("processors") of the computing element and/or memory of the computing element. A block mode storage device may also be a network-enabled storage device that is connected via a network to the computing element and that comprises other block mode storage devices such as disk drives and flash drives.

More powerful DBMSs are hosted on a parallel processer hardware platform. Such DBMSs are referred to herein as multi-node DBMSs. A multi-node DBMS comprises multiple computing elements referred to herein as computing nodes. Each computing node comprises a hardware processor or multiple hardware processors that each share access to the same main memory.

FIG. 1 is a block diagram that depicts a multi-node DBMS 100 comprising computing node 102-1 and computing node 102-2. Although the example of FIG. 1 depicts two computing nodes, it should be appreciated that a multi-node DBMS may include more than two computing nodes in some embodiments.

Computing node 102-1 comprises database server instances 103-1*a* and 103-1*b*; and computing node 102-2 comprises database server instances 103-2*a* and 103-2*b*. Each database server instance is connected by a high-speed network 101 to shared storage 121 and provides access to the same database stored on shared storage 121. Although the example of FIG. 1 depicts two database server instances hosted on each computing node, it should be appreciated that any number of database server instances (including one database server instance) may be hosted on a computing node.

Shared storage 121 includes persistent storage 129 for storing "database files" of the one or more databases of DBMS 100. Persistent storage 129 may comprise persistent storage devices such as disk devices or flash memory devices.

One or more storage processes (not shown) may be executed by one or more computing elements of shared storage 121 to receive requests from any of the database server instances of DBMA 100 to read or write data blocks from or to database files stored in persistent storage 129. As will be explained in greater detail below, the one or more storage processes may write data blocks to database files stored in persistent storage 129 as part of a set of global checkpoint operations.

Each of the database server instances of DBMS 100 comprise database processes that run on the computing node that hosts the database server instance. A database process may be, without limitation, a process running within a database session that executes database commands issued within the database session or a query execution process belonging to a pool of processes that is assigned to execute queries issued through database sessions.

Referring to FIG. 1, each of database server instances 103-1*a*, 103-1*b*, 103-2*a*, and 103-2*b* comprise multiple database processes and a database buffer cache. Although the example of FIG. 1 depicts two database processes per database server instance, it should be appreciated that a database server instance may comprise any number (including one database process) of database processes. A database buffer cache stores data blocks read from shared storage 121. Additionally, a database buffer cache stores any modifications to those data blocks. Modified data blocks stored in a database buffer cache are referred to herein as "dirty" data blocks.

In FIG. 1, database server instances 103-1*a* and 103-1*b* are hosted on computing node 102-1; and database server instances 103-2*a* and 103-2*b* are hosted on computing node 102-2. Database server instance 103-1*a* comprises database processes 105-1*a* and 105-1*b* as well as database buffer cache 108-1a, which is allocated from main memory 104-1. Database server instance 103-1b comprises database processes 105-1c and 105-1d as well as database buffer cache 108-1b, which is also allocated from main memory 104-1. Database server instance 103-2a comprises database processes 105-2a and 105-2b as well as database buffer cache 108-2a, which is allocated from main memory 104-2. Database server instance 103-2b comprises database processes 105-2c and 105-2d as well as database buffer cache 108-2b, which is also allocated from main memory 104-2.

When a database server instance performs a smart scan request against a database object, the database server may trigger a set of global checkpoint operations for the database object. Thus, each database server instance may cause the dirty data blocks stored in the database server instance's buffer cache, if any, to be written to shared storage 121.

Read-Mostly Locking

To read or change a data block in a database object, a database server instance obtains a shared read lock or an exclusive write lock. Obtaining any of these kinds of locks requires significant interaction and messaging between database server instances in a multi-node database system. There are "read-mostly" situations in which database objects are infrequently modified but frequently read, such as occurs in OLAP ("Online Analytical Processing") environments. To avoid much of the overhead of obtaining a shared read lock, database server instances enter a mode for one or more database objects referred to as read-mostly locking.

Read-mostly locking uses information on anti-locks locally stored at a database server instance. In read-mostly locking, anti-locks are generated when database objects are modified. More specifically, when a database object is to be modified (and an exclusive write lock is to be granted to a requesting instance), the master instance for the database object broadcasts a message causing other database server instances to create anti-locks for that database object. As a result, each database server instance has the same or similar list of anti-locks, and each database server instance can grant itself a shared read lock on a data block in the database object by checking its own list of anti-locks. If the list includes an anti-lock for a data block in the database object, then the database server instance cannot grant itself a shared read lock for the database object until a set of global checkpoint operations are performed for the database object. However, if an anti-lock for any data block in the database object is absent from the list, then the database server instance can grant itself a shared read lock for the database object.

DBMS 100 may enforce a policy that automatically switches a database object into the "read-mostly" locking mode if certain criteria are satisfied. Thus, DBMS 100 may monitor database objects for the number of global checkpoint operations performed during a particular time period and for the number of dirty data blocks associated with the database objects by the end of that time period. If a database object has a relatively high number (e.g., exceeding a predetermined threshold) of global checkpoint operations performed but has a relatively low number (e.g., failing to exceed a predetermined threshold) of dirty data blocks, then that database object may be automatically switched into the read-mostly locking mode.

Remote Direct Memory Access

In the example of FIG. 1, network 101 is labeled "RDMA-enabled." Thus, database computing node 102-1 can communicate via network 101 with database computing node 102-2 using remote direct memory access (RDMA). RDMA enables direct transfer of data by making it unnecessary to copy the data to volatile memory before transmitting the data.

In RDMA, the direct transfer of data occurs through a RDMA mechanism on each of the computing elements involved in the data transfer. According to an embodiment, the RDMA mechanism comprises a RDMA-capable network interface hardware controller (RNIC) on each of the computing elements. A process running on a hardware processor (e.g. general-purpose central processing unit) of an "initiating" computing element may issue a RDMA read request to a "local" RNIC on the initiating computing element to read data stored at a "remote" memory address in the "remote" memory of a "remote" computing element and write the data to a "local" memory address within "local" memory on the initiating computing element. In response to receiving the RDMA read request, the local RNIC and the remote RNIC transfer data from the remote memory to the local memory. The remote RNIC reads data at the remote memory address, transmits the data over the RDMA-enabled network to the local RNIC, which writes the data to the local memory at the local memory address. No hardware processor (e.g. general-purpose central processing unit) that is not part of the local RNIC and remote RNIC participates in reading the data from the remote memory, transmitting the data over the RDMA-enabled network, and writing the data to the local memory.

Once the transfer of the data is completed, the local RNIC signals that the transfer of the data has been completed. The process initiating the request or another process may then access the transferred data at the local memory address.

Database Object Hash Tables

Using RDMA, a database server instance can access data of a different database server instance even if the different database server instance is hosted on a different database computing node. Moreover, the database server instance can do so without the different database server instance even being aware that its data is being accessed. In particular, the accessed data can be data maintained in the main memory of the different database computing node.

Data maintained in main memory may include data blocks in a buffer cache as well as metadata about the data blocks in the buffer cache. In some embodiments, the metadata may include a hash table indicating which database objects are associated with dirty data blocks in the buffer cache. Such a hash table is referred to herein as an object hash table. An embodiment of an object hash table is depicted in FIG. 1 and, in greater detail, in FIG. 2.

Referring to FIG. 1, main memory 104-1 of database computing node 102-1 includes buffer caches 108-1a and 108-1b as well as object hash tables 109-1a and 109-1b. Buffer cache 108-1a and object hash table 109-1a are maintained in a region of main memory 104-1 allocated for database server instance 103-1a; and buffer cache 108-1b and object hash table 109-1b are maintained in a region of main memory 104-1 allocated for database server instance 103-1b. Main memory 104-2 of database computing node 102-2 includes buffer caches 108-2a and 108-2b as well as object hash tables 109-2a and 109-2b. Buffer cache 108-2a and object hash table 109-2a are maintained in a region of main memory 104-2 allocated for database server instance 103-2a; and buffer cache 108-2b and object hash table 109-2b are maintained in a region of main memory 104-2 allocated for database server instance 103-2b.

To enable accessing data of a different database server instance, each database server instance may maintain configuration data (not shown) that indicates the storage location in main memory for the data to be accessed. For example, to enable accessing object hash table 109-2a, database server instance 103-1a may maintain (in its allocated region of main memory 104-1) configuration data including the base memory address of object hash table 109-2a in main memory 104-2. As used herein, the base memory address of a data structure is the memory address of the beginning of the region of memory in which the data structure is stored. In some embodiments, configuration data may also include the memory size of a hash table bucket and/or other information about an object hash table. Configuration data may be generated and propagated to the computing nodes of DBMS 100, for example, as part of startup operations of DBMS 100 or a node join operation to add a database server instance as an instance to DBMS 100.

Figure 2:
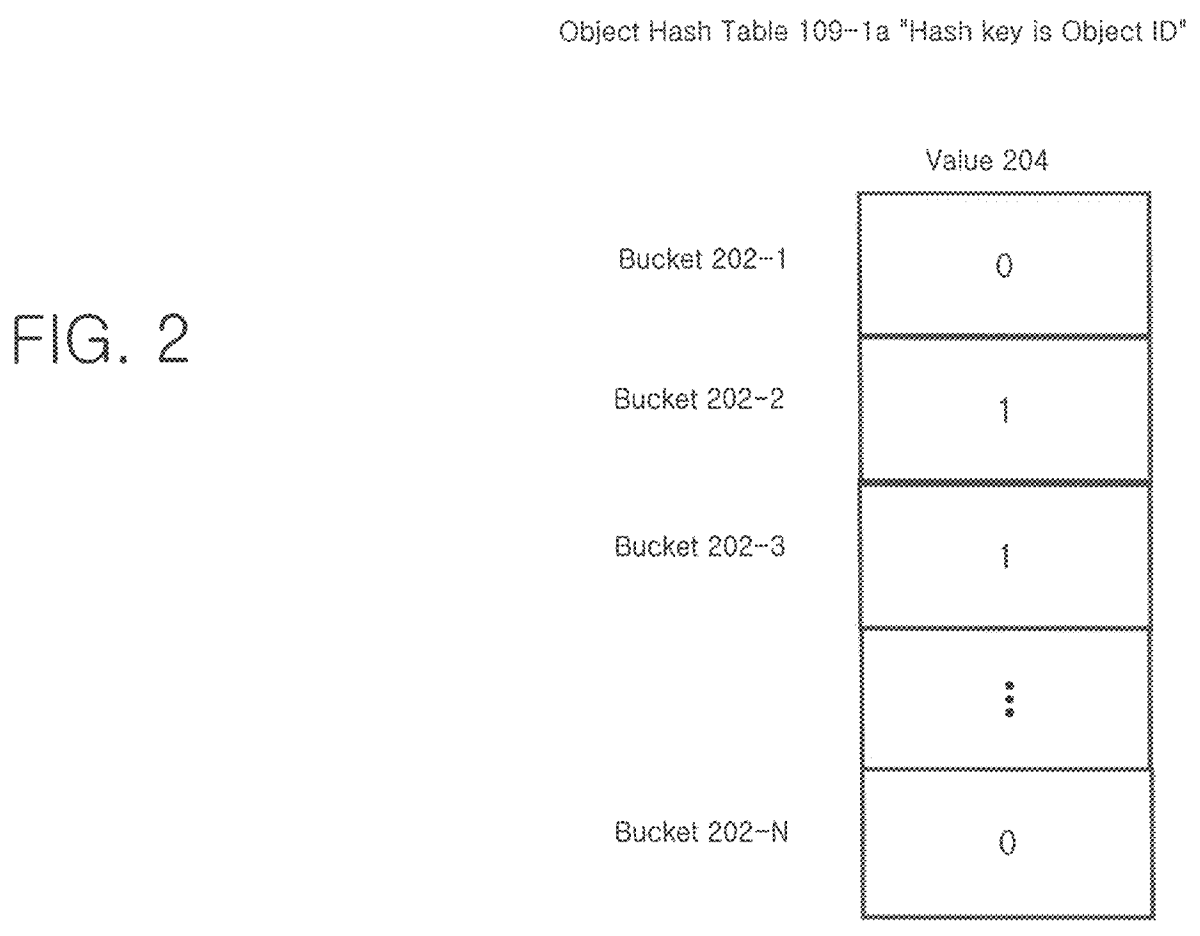

FIG. 2 depicts an example object hash table in which hash keys are object identifiers. Object hash table 109-1a includes buckets 202-1 to 202-N, where N can correspond to any number. For example, if object hash table 109-1a includes six buckets, then the bucket 202-N of FIG. 2 would be labeled bucket 202-6.

Each bucket corresponds to one or more database objects. More specifically, each bucket corresponds to a hash value that is derived by applying a hash function to an object identifier. Thus, it is possible for different database objects to correspond to the same bucket due to hashing collisions.

In the example of FIG. 2, each bucket maps to value 204, which indicates whether or not there are any dirty data blocks associated with any of the database objects corresponding to the bucket. In some embodiments, value 204 may be a Boolean value indicating the presence or absence of dirty data blocks. In some embodiments, value 204 may be a count of how many dirty data blocks exist for the bucket.

Example Process Based on Checking Object Hash Tables

Figure 3:
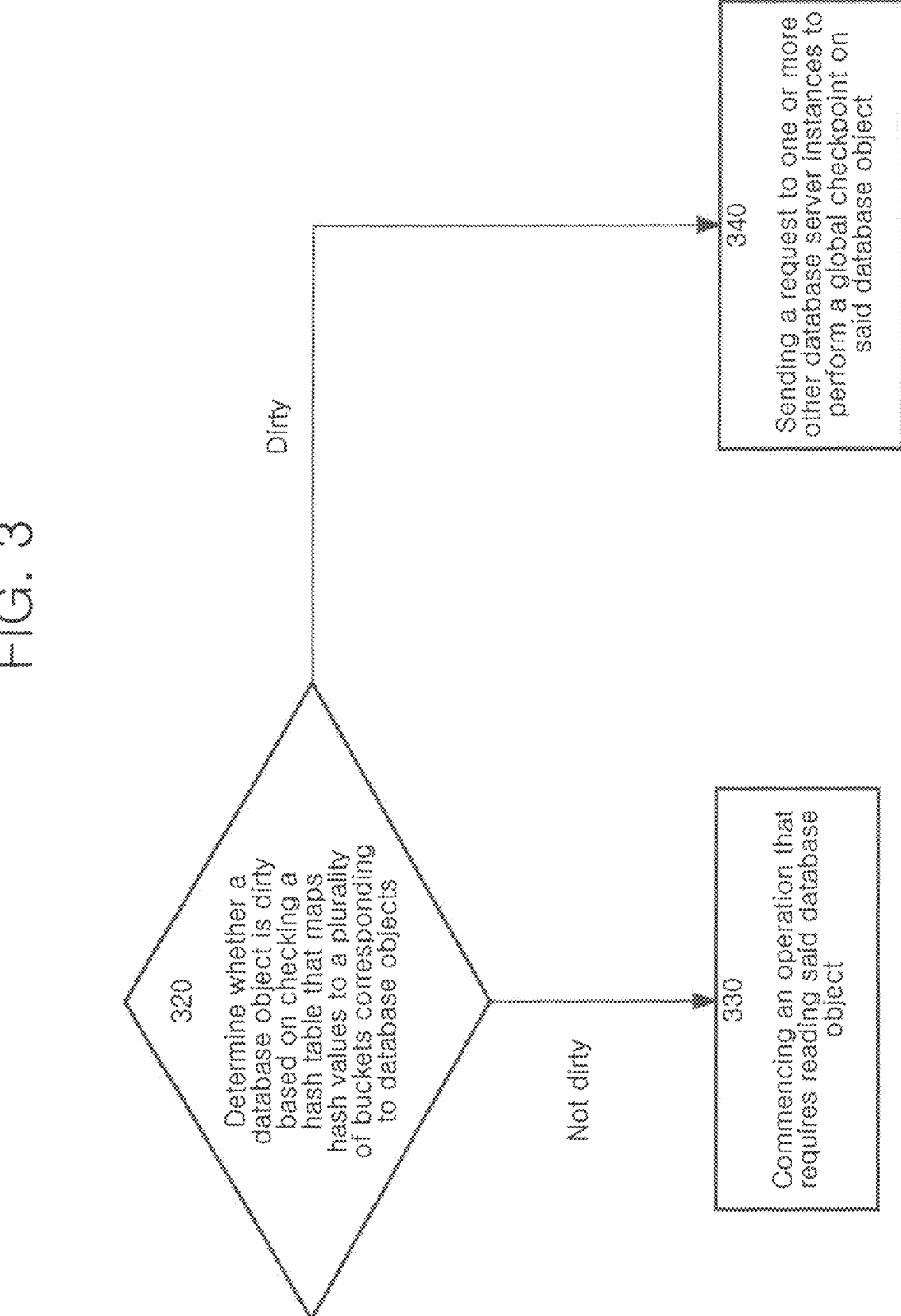
FIG. 3 depicts an example process for determining whether a database object is dirty based on checking object hash tables.

Using RDMA and object hash tables, it is possible to determine or otherwise ensure a database object is not dirty without performing a set of global checkpoint operations. FIG. 3 depicts an example process for doing so.

At block 320, a database server instance in a multi-node database system makes a determination as to whether a database object to be read is dirty. The multi-node database system includes a plurality of database server instances that share access to a database that stores the database object. In some embodiments, the database object is a table partition. In some embodiments, the database object includes database data blocks that each contain transactional metadata.

The database server instance may determine whether the database object is dirty prior to or concurrently with performing a smart scan on a database object. More specifically, the database server instance may make this determination based on checking hash tables that map database objects to metadata indicating whether the database objects are dirty. For example, database server instance 103-2a may check object hash tables 109-1a, 109-1b, 109-2a, and 109-2b to determine whether the database object is dirty.

As discussed above, an object hash table may comprise a plurality of buckets corresponding to a plurality of database objects. Each bucket may correspond to a hash value derived by applying a hash function to a database object identifier (e.g., an alphanumeric identifier). Furthermore, each bucket may map to metadata (e.g., a Boolean value) indicating whether there are any dirty database data blocks associated with the database object(s) corresponding to the bucket.

Thus, checking an object hash table can entail multiple sub-processes. For example, it can entail generating a hash value for the database object, determining that a bucket of the plurality of buckets maps to the hash value, and checking the bucket for metadata indicating whether the database object is dirty.

Using RDMA, checking an object hash table can be performed quickly and cheaply. Thus, even if an object hash table (e.g., table 109-1a) is maintained in a memory of a first database computing node (e.g., node 102-1), a second database computing node (e.g., node 102-2) has a memory address of the object hash table such that the second database computing node has direct access to the object hash table in the first database computing node.

Referring to FIG. 3, block 320 proceeds to block 330 if the database server instance determines that the database object is not dirty. If the database server instance determines that the database object is dirty, block 320 proceeds to block 340.

At block 330, the database server instance commences an operation that requires reading the database object, thereby avoiding performance of a set of global checkpoints. In some embodiments, the operation is a smart scan at a storage server of the database object.

At block 340, the database server instance sends a request to one or more other database server instances of the plurality of database server instances to perform a global checkpoint on the database object. For example, instances 103-1a, 103-1b, 103-2a, and 103-2b may each write the plurality of database data blocks in buffer caches 108-1a, 108-1b, 108-2a, and 108-2b to persistent storage 129. Upon doing so, the database object may be safely read.

Example Process Based on Checking for Anti-Locks

Additionally or alternatively, by checking for anti-locks, it is possible to determine or otherwise ensure a database object is not dirty without performing a set of global checkpoint operations. FIG. 4 depicts an example process for doing so.

At block 420, a database server instance determines whether a database object is dirty based on checking a list of anti-locks for any anti-locks placed on database data blocks associated with the database object. The multi-node database system includes a plurality of database server instances that share access to a database that stores the database object. In some embodiments, the database object is a table partition. In some embodiments, the database object includes database data blocks that each contain transactional metadata.

As described above, anti-locks are special locks that prevent shared read locks from being placed on certain database data blocks. Anti-locks are created for data blocks when a database server instance broadcasts a message indicating that an exclusive write lock is being granted for the data blocks. Thus, each database server instance may maintain the same or similar list of anti-locks. Accordingly, when a database server instance desires to read particular data blocks, the instance can simply access its own list of anti-locks to check for the particular data blocks. Advantageously, this avoids the overhead involved in messaging between instances.

Referring to FIG. 4, block 420 proceeds to block 430 if the database server instance determines that the database object is not dirty. If the database server instance determines that the database object is dirty, block 420 proceeds to block 440.

At block 430, the database server instance commences an operation that requires reading the database object, thereby avoiding performance of a set of global checkpoints. In some embodiments, the operation is a smart scan at a storage server of the database object.

At block 440, the database server instance sends a request to one or more other database server instances to perform a global checkpoint on the database object. Doing so ensures consistency, thereby making it safe for the database object to be read.

Database Management System Overview

A database management system (DBMS) manages a database. A DBMS may comprise one or more database servers. A database comprises database data and a database dictionary that are stored on a persistent memory mechanism, such as a set of hard disks. Database data may be stored in one or more collections of records. The data within each record is organized into one or more attributes. In relational DBMSs, the collections are referred to as tables (or data frames), the records are referred to as records, and the attributes are referred to as attributes. In a document DBMS ("DOCS"), a collection of records is a collection of documents, each of which may be a data object marked up in a hierarchical-markup language, such as a JSON object or XML document. The attributes are referred to as JSON fields or XML elements. A relational DBMS may also store hierarchically-marked data objects; however, the hierarchically-marked data objects are contained in an attribute of record, such as JSON typed attribute.

Users interact with a database server of a DBMS by submitting to the database server commands that cause the database server to perform operations on data stored in a database. A user may be one or more applications running on a client computer that interacts with a database server. Multiple users may also be referred to herein collectively as a user.

A database command may be in the form of a database statement that conforms to a database language. A database language for expressing the database commands is the Structured Query Language (SQL). There are many different versions of SQL; some versions are standard and some proprietary, and there are a variety of extensions. Data definition language ("DDL") commands are issued to a database server to create or configure data objects referred to herein as database objects, such as tables, views, or complex data types. SQL/XML is a common extension of SQL used when manipulating XML data in an object-relational database. Another database language for expressing database commands is Spark™ SQL, which uses a syntax based on function or method invocations.

A database command may also be in the form of an API call. The call may include arguments that each specifies a respective parameter of the database command. The parameter may specify an operation, condition, and target that may be specified in a database statement. A parameter may specify, for example, a column, field, or attribute to project, group, aggregate, or define in a database object.

In a DOCS, a database command may be in the form of functions or object method calls that invoke CRUD (Create Read Update Delete) operations. Create, update, and delete operations are analogous to insert, update, and delete operations in DBMSs that support SQL. An example of an API for such functions and method calls is MQL (MondoDB™ Query Language). In a DOCS, database objects include a collection of documents, a document, a view, or fields defined by a JSON schema for a collection. A view may be created by invoking a function provided by the DBMS for creating views in a database.

Changes to a database in a DBMS are made using transaction processing. A database transaction is a set of operations that change database data. In a DBMS, a database transaction is initiated in response to a database command requesting a change, such as a DML command requesting an update, insert of a record, or a delete of a record or a CRUD object method invocation requesting to create, update or delete a document. DML commands and DDL specify changes to data, such as INSERT and UPDATE statements. A DML statement or command does not refer to a statement or command that merely queries database data. Committing a transaction refers to making the changes for a transaction permanent.

Under transaction processing, all the changes for a transaction are made atomically. When a transaction is committed, either all changes are committed, or the transaction is rolled back. These changes are recorded in change records, which may include redo records and undo records. Redo records may be used to reapply changes made to a data block. Undo records are used to reverse or undo changes made to a data block by a transaction.

An example of such transactional metadata includes change records that record changes made by transactions to database data. Another example of transactional metadata is embedded transactional metadata stored within the database data, the embedded transactional metadata describing transactions that changed the database data.

Undo records are used to provide transactional consistency by performing operations referred to herein as consistency operations. Each undo record is associated with a logical time. An example of logical time is a system change number (SCN). An SCN may be maintained using a Lamporting mechanism, for example. For data blocks that are read to compute a database command, a DBMS applies the needed undo records to copies of the data blocks to bring the copies to a state consistent with the snap-shot time of the query. The DBMS determines which undo records to apply to a data block based on the respective logical times associated with the undo records.

When operations are referred to herein as being performed at commit time or as being commit time operations, the operations are performed in response to a request to commit a database transaction. DML commands may be auto-committed, that is, are committed in a database session without receiving another command that explicitly requests to begin and/or commit a database transaction. For DML commands that are auto-committed, the request to execute the DML command is also a request to commit the changes made for the DML command.

In a distributed transaction, multiple DBMSs commit a distributed transaction using a two-phase commit approach. Each DBMS executes a local transaction in a branch transaction of the distributed transaction. One DBMS, the coordinating DBMS, is responsible for coordinating the commitment of the transaction on one or more other database systems. The other DBMSs are referred to herein as participating DBMSs.

A two-phase commit involves two phases, the prepare-to-commit phase, and the commit phase. In the prepare-to-commit phase, branch transaction is prepared in each of the participating database systems. When a branch transaction is prepared on a DBMS, the database is in a "prepared state" such that it can guarantee that modifications executed as part of a branch transaction to the database data can be committed. This guarantee may entail storing change records for the branch transaction persistently. A participating DBMS acknowledges when it has completed the prepare-to-commit phase and has entered a prepared state for the respective branch transaction of the participating DBMS.

In the commit phase, the coordinating database system commits the transaction on the coordinating database system and on the participating database systems. Specifically, the coordinating database system sends messages to the participants requesting that the participants commit the modifications specified by the transaction to data on the participating database systems. The participating database systems and the coordinating database system then commit the transaction.

On the other hand, if a participating database system is unable to prepare or the coordinating database system is unable to commit, then at least one of the database systems is unable to make the changes specified by the transaction. In this case, all of the modifications at each of the participants and the coordinating database system are retracted, restoring each database system to its state prior to the changes.

A client may issue a series of requests, such as requests for execution of queries, to a DBMS by establishing a database session. A database session comprises a particular connection established for a client to a database server through which the client may issue a series of requests. A database session process executes within a database session and processes requests issued by the client through the database session. The database session may generate an execution plan for a query issued by the database session client and marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables and other information.

A database server includes multiple database processes. Database processes run under the control of the database server (i.e. can be created or terminated by the database server) and perform various database server functions. Database processes include processes running within a database session established for a client.

A database process is a unit of execution. A database process can be a computer system process or thread or a user-defined execution context such as a user thread or fiber. Database processes may also include "database server system" processes that provide services and/or perform functions on behalf of the entire database server. Such database server system processes include listeners, garbage collectors, log writers, and recovery processes.

A multi-node database management system is made up of interconnected computing nodes ("nodes"), each running a database server that shares access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

A database dictionary may comprise multiple data structures that store database metadata. A database dictionary may, for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the attribute names and data types of the attributes, and one or more files or portions thereof that store data for the table. Metadata in the database dictionary defining a procedure may specify a name of the procedure, the procedure's arguments and the return data type, and the data types of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user-defined function implemented in a JAVA class may be defined in part by the database dictionary by specifying the name of the user-defined function and by specifying a reference to a file containing the source code of the Java class (i.e., java file) and the compiled version of the class (i.e., class file).

Native data types are data types supported by a DBMS "out-of-the-box". Non-native data types, on the other hand, may not be supported by a DBMS out-of-the-box. Non-native data types include user-defined abstract types or object classes. Non-native data types are only recognized and processed in database commands by a DBMS once the non-native data types are defined in the database dictionary of the DBMS, by, for example, issuing DDL statements to the DBMS that define the non-native data types. Native data types do not have to be defined by a database dictionary to be recognized as a valid data types and to be processed by a DBMS in database statements. In general, database software of a DBMS is programmed to recognize and process native data types without configuring the DBMS to do so by, for example, defining a data type by issuing DDL statements to the DBMS.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
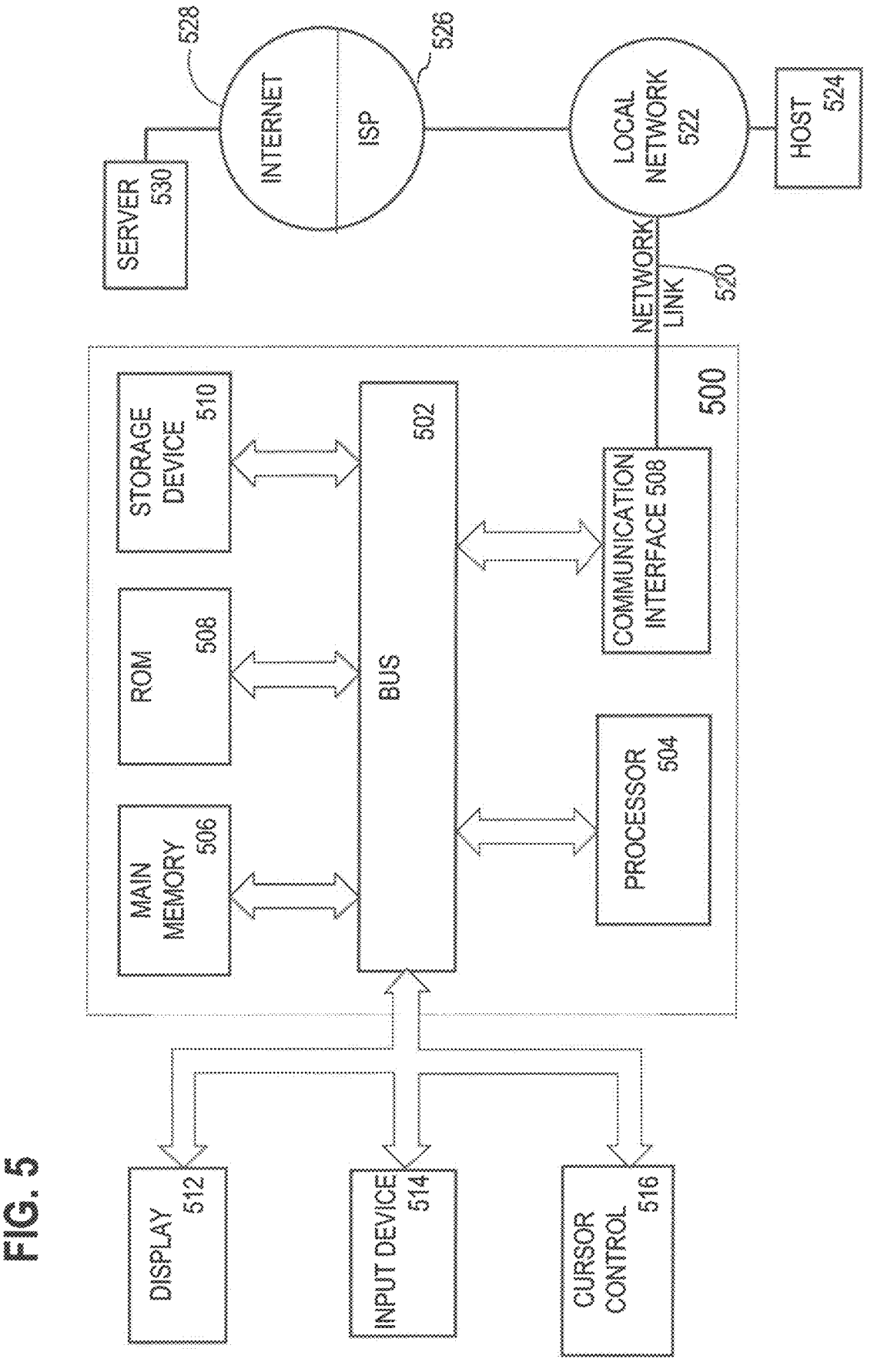
FIG. 5 depicts an example computing device upon which embodiments may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Software Overview

Figure 6:
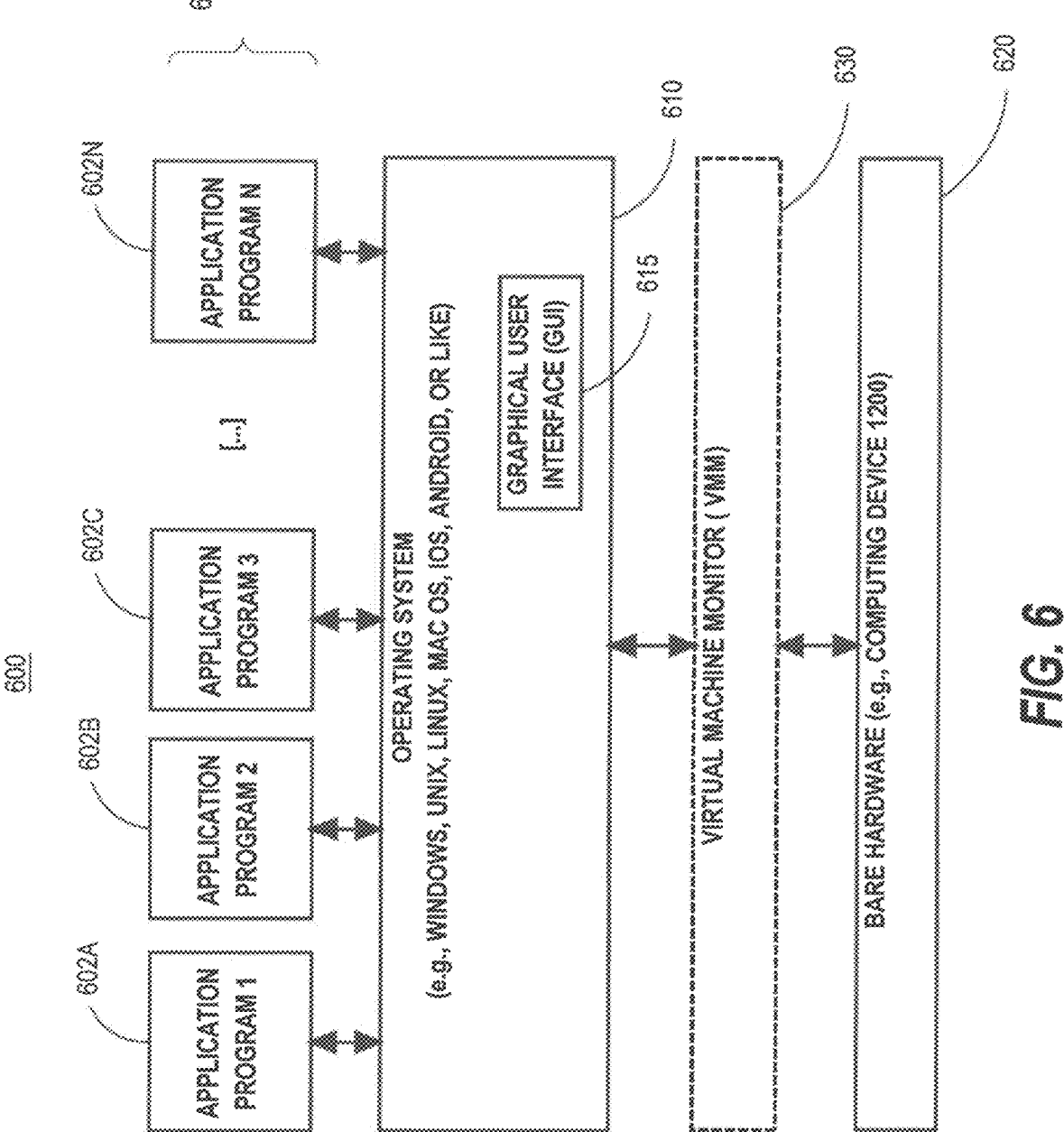
FIG. 6 depicts an example software system that may be employed for controlling the operation of a computing device.

FIG. 6 is a block diagram of a basic software system 600 that may be employed for controlling the operation of computer system 500. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computer system 500. Software system 600, which may be stored in system memory (RAM) 506 and on fixed storage (e.g., hard disk or flash memory) 510, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 510 into memory 506) for execution by the system 600. The applications or other software intended for use on computer system 500 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 504) of computer system 500. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the computer system 500.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of computer system 500 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

Computing Nodes and Clusters

A computing node is a combination of one or more hardware processors that each share access to a byte-addressable memory. Each hardware processor is electronically coupled to registers on the same chip of the hardware processor and is capable of executing an instruction that references a memory address in the addressable memory and that causes the hardware processor to load data at that memory address into any of the registers. In addition, a hardware processor may have access to its separate exclusive memory that is not accessible to other processors. One or more hardware processors may be running under the control of the same operating system A hardware processor may comprise multiple core processors on the same chip, each core processor ("core") being capable of separately executing a machine code instruction within the same clock cycles as another of the multiple cores. Each core processor may be electronically coupled to connect to a scratchpad memory that cannot be accessed by any other core processor of the multiple core processors.

A cluster comprises computing nodes that communicate with each other via a network. Each node in a cluster may be coupled to a network card or a network-integrated circuit on the same board of the computing node. Network communication between any two nodes occurs via the network card or network integrated circuit on one of the nodes and a network card or network integrated circuit of another of the nodes. The network may be configured to support remote direct memory access.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Extensions and Alternatives

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation. In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A method performed by one or more computing devices, said method comprising:
   a database server instance in a multi-node database system determining whether a database object is dirty, wherein said multi-node database system includes a plurality of database server instances that share access to a database that stores said database object, wherein determining whether a database object is dirty comprises checking a list of anti-locks for any anti-locks placed on database data blocks associated with said database object, said anti-locks preventing shared read locks from being granted, said anti-locks being created when messages are broadcasted to indicate that exclusive write locks are being granted, the list being maintained by each database server instance of said plurality of database server instances;
   when said database object is dirty, sending a request to one or more other database server instances of said plurality of database server instances to perform a global checkpoint on said database object;
   when said database object is not dirty, commencing an operation that requires reading said database object.

2. The method of claim 1, wherein said operation involves offloading, from said database server instance to a storage server of said multi-node database system, processing to be performed on said database object for a query.

3. The method of claim 1, wherein said database object is a table partition that is a subdivision of a database table.

4. The method of claim 1, wherein said database object includes database data blocks that each contain transactional metadata.

5. A method performed by one or more computing devices, said method comprising:
   a database server instance in a multi-node database system determining whether a database object is dirty, wherein said multi-node database system includes a plurality of database server instances that share access to a database that stores said database object, wherein determining whether a database object is dirty comprises checking a hash table that maps database objects to metadata indicating whether said database objects are dirty;
   when said database object is dirty, sending a request to one or more other database server instances of said plurality of database server instances to perform a global checkpoint on said database object;
   when said database object is not dirty, commencing an operation that requires reading said database object.

6. The method of claim 5, wherein said hash table is maintained in a memory of a first database computing node of said multi-node database system, and wherein a second database computing node of said multi-node database system has a memory address of said hash table so that said second database computing node has direct access to said hash table in said first database computing node.

7. The method of claim 5, wherein said hash table comprises a plurality of buckets corresponding to a plurality of database objects.

8. The method of claim 7, wherein checking said hash table comprises:

generating a hash value for said database object;

determining that a bucket of said plurality of buckets maps to said hash value; and checking said bucket for metadata indicating whether said database object is dirty.

9. The method of claim 8, wherein said metadata includes a Boolean value indicating whether said bucket corresponds to any dirty database objects.

10. One or more non-transitory storage media storing one or more sequences of instructions which, when executed by one or more computing devices, cause:

a database server instance in a multi-node database system determining whether a database object is dirty, wherein said multi-node database system includes a plurality of database server instances that share access to a database that stores said database object, wherein determining whether a database object is dirty comprises checking a list of anti-locks for any anti-locks placed on database data blocks associated with said database object, said anti-locks preventing shared read locks from being granted, said anti-locks being created when messages are broadcasted to indicate that exclusive write locks are being granted, the list being maintained by each database server instance of said plurality of database server instances;

when said database object is dirty, sending a request to one or more other database server instances of said plurality of database server instances to perform a global checkpoint on said database object;

when said database object is not dirty, commencing an operation that requires reading said database object.

11. The one or more non-transitory storage media of claim 10, wherein said operation involves offloading, from said database server instance to a storage server of said multi-node database system, processing to be performed on said database object for a query.

12. The one or more non-transitory storage media of claim 10, wherein said database object is a table partition that is a subdivision of a database table.

13. The one or more non-transitory storage media of claim 10, wherein said database object includes database data blocks that each contain transactional metadata.

14. One or more non-transitory storage media storing one or more sequences of instructions which, when executed by one or more computing devices, cause:

a database server instance in a multi-node database system determining whether a database object is dirty, wherein said multi-node database system includes a plurality of database server instances that share access to a database that stores said database object, wherein determining whether a database object is dirty comprises checking a hash table that maps database objects to metadata indicating whether said database objects are dirty;

when said database object is dirty, sending a request to one or more other database server instances of said plurality of database server instances to perform a global checkpoint on said database object;

when said database object is not dirty, commencing an operation that requires reading said database object.

15. The one or more non-transitory storage media of claim 14, wherein said hash table is maintained in a memory of a first database computing node of said multi-node database system, and wherein a second database computing node of said multi-node database system has a memory address of said hash table so that said second database computing node has direct access to said hash table in said first database computing node.

16. The one or more non-transitory storage media of claim 14, wherein said hash table comprises a plurality of buckets corresponding to a plurality of database objects.

17. The one or more non-transitory storage media of claim 16, wherein checking said hash table comprises:

generating a hash value for said database object;

determining that a bucket of said plurality of buckets maps to said hash value; and checking said bucket for metadata indicating whether said database object is dirty.

18. The one or more non-transitory storage media of claim 17, wherein said metadata includes a Boolean value indicating whether said bucket corresponds to any dirty database objects.

\* \* \* \* \*